May 20, 1952 N. D. PRESTON 2,597,818

COMMUNICATION SYSTEM

Filed May 9, 1946 4 Sheets-Sheet 1

INVENTOR.

Neil D. Preston

May 20, 1952 N. D. PRESTON 2,597,818

COMMUNICATION SYSTEM

Filed May 9, 1946 4 Sheets-Sheet 2

INVENTOR.
Neil D. Preston

May 20, 1952 N. D. PRESTON 2,597,818

COMMUNICATION SYSTEM

Filed May 9, 1946 4 Sheets-Sheet 3

TYPICAL CABOOSE (PRIMARY) STATION

TYPICAL LOCOMOTIVE (SECONDARY) STATION

INVENTOR.

Neil D. Preston

May 20, 1952 N. D. PRESTON 2,597,818

COMMUNICATION SYSTEM

Filed May 9, 1946 4 Sheets-Sheet 4

INVENTOR.
Neil D. Preston

Patented May 20, 1952 2,597,818

UNITED STATES PATENT OFFICE 2,597,818

COMMUNICATION SYSTEM

Neil D. Preston, Rochester, N. Y., assignor to General Railway Signal Company, Rochester, N. Y.

Application May 9, 1946, Serial No. 668,353

8 Claims. (Cl. 250—6)

This invention relates to radio communication systems, and more particularly to radio communication systems designed to provide for two-way communication between a number of vehicles on railroads or the like, having transmitting and receiving equipment of limited range, and a central office over a territory larger than the effective operating range of the vehicle equipments.

In providing radio communication systems for railroads and similar applications involving communication between a number of movable vehicles and a central office throughout an extensive territory greater than the operating range of the radio equipment on the vehicles, it is expedient to provide suitable transmitting and receiving apparatus at a plurality of fixed stations suitably located and spaced in the territory to provide coverage over the different communication areas constituting the territory for desired communication, so that a vehicle at any point in the territory is in some one of the communication areas served by the fixed stations. The range of each fixed station is of course sufficient to properly cover the communication area assigned to it. In this way, any vehicle in the territory is within range of one station.

These fixed stations, which in the case of a railroad communication system are conveniently termed way stations, are connected to the central office by a suitable two-way communication channel operating over line wires or by space radiation, so that messages received at any fixed station from a vehicle within range of that station will be transmitted over this communication channel to the central office, and any message from the central office may be transmitted over the communication channel to the various fixed stations to be broadcast by these stations to reach all vehicles in the communication territory.

In such a type of communication system, particularly for use on railroads, it is desirable to provide for communication between the various vehicles, as well as between the central office and the vehicles. In the case of train communication systems for railroads, it is also expedient and desirable to provide for communication between the front and rear ends of the same train.

In such an organization, when a given vehicle in a communication area is transmitting a message to the central office, it is desirable that persons on other vehicles in other communication areas and beyond the operating range of said given vehicle should not also start to send a message to the central office and mutilate or interfere with the message being transmitted to the central office by the first vehicle. Although it is desirable to prevent such break-in interference from other vehicles upon a message being sent to the central office, there is no reason why vehicles beyond the range of a vehicle communicating to the control office should not communicate with each other; and when the communication territory is extensive, it is desirable to permit trains in one communication area to communicate freely with each other while some vehicle in another communication area is sending a message to the central office.

In view of these considerations, and speaking generally and without attempting to define the nature or scope of the present invention, it is proposed to provide a communication system of the type under consideration in which the various vehicles in a communication territory are prevented from breaking in upon transmission of a message from any one of these vehicles to the central office, even though beyond the operating range of such vehicle, and in which unrestricted communication is permitted between vehicles which are beyond the range of said vehicle communicating with the central office. Stated more specifically, it is proposed to provide suitable means at each of the plurality of fixed stations, which is operated over the communication channel between these stations and the central office, and which is responsive to the transmission to any one of these stations from a vehicle, for rendering all of the other stations ineffective to respond to messages for the control office that may be attempted by other vehicles within range of these other stations, so that these other vehicles in other communication areas of the territory may not break in upon the transmission of a message to the central office, but are not prevented from communicating with each other.

The primary object of this invention is to provide simple and effective means for providing these functions and obtaining these objectives. Various other objects, purposes, characteristic features and attributes of the invention will be in part apparent, and in part pointed out as the particular organization and structure of parts herein disclosed as typical embodiments of the invention are described.

Although this invention is applicable to communication systems for various purposes and uses, including different types of mobile units or vehicles, such as for communication between a central office and police cars, trucks, buses or watercraft, or between some central office and a plurality of fixed stations of limited range connected to the central office by a suitable communication channel, it is convenient to illustrate and describe the invention as applied to a train communication system for railroads, and to explain the functions and mode of operation of the invention, using the terms and procedures relating to such a train communication system.

In describing in detail particular embodiments of the invention chosen for the present disclosure, reference will be made to the accompanying drawings, in which like reference letters and numbers are employed, sometimes with distinctive prefix numbers, to designate similar and corresponding component elements of the system, and in which.

Figure 1B:
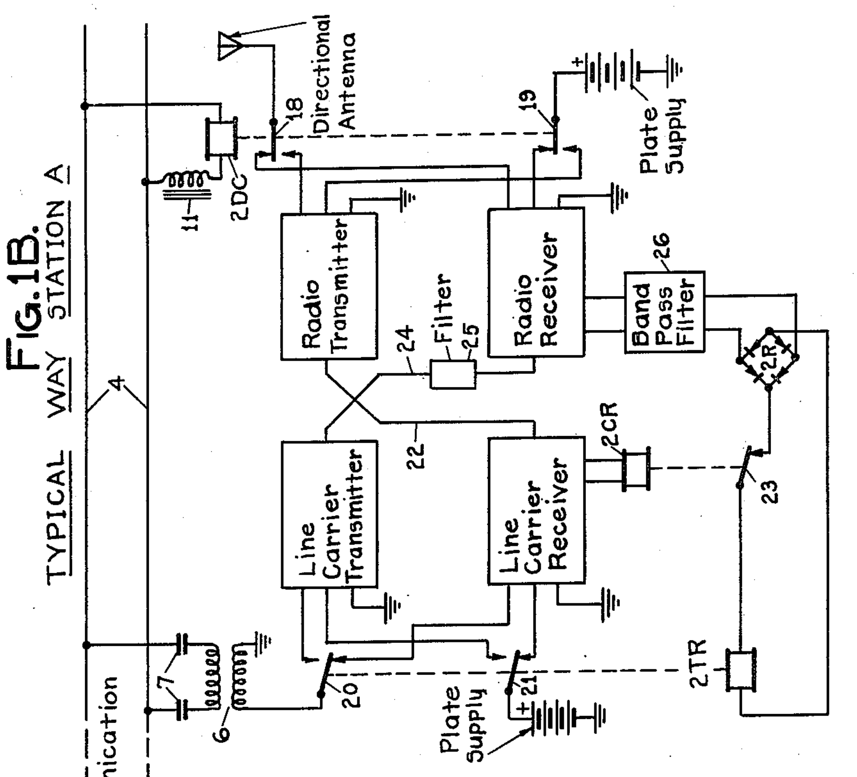
Figs. 1A and 1B illustrate diagrammatically and conventionally the parts and circuits constituting the equipments at a central office and a way station respectively, together with the line circuit constituting the communication channel between the central office and the various way stations equipped the same as the typical way station shown in Fig. 1B.

In order to simplify the illustration in the drawings, and also to facilitate an explanation and understanding of the more important characteristics of the invention, various parts and circuits have been illustrated in accordance with certain conventions. Some component elements of the system, such as the conventional radio transmitters and receivers are indicated in block form; and other well known devices, such as microphones and loud speakers, have been illustrated schematically. To simplify the illustration of the electrical connections and circuits, arrows with the symbols (+) and (−) are used to indicate connections to the opposite terminals of a battery, or other suitable source of operating energy for the circuits, the direction of these arrows indicating a flow of current into and out of the connecting wires. The various relays, which are assumed to be of the usual neutral type with armatures biased to the retracted position by gravity or spring means, are illustrated conventionally, with their windings in block form, and their associated contact fingers in a lower or inclined position when the relay winding is deenergized, and in the raised or horizontal position when the relay winding is energized, these contact fingers being shown either above or below the showing of the relay winding and indicated as connected thereto by dotted lines, as more convenient for the spacing and location of the parts.

Considering the general organization of the specific embodiment of the invention illustrated and designed for train communication on railroads, it is contemplated that the communication between front and rear ends of a train, between different trains, and between trains and the central office will be carried out on the same radio carrier frequency in the megacycle band of frequencies at present allotted to such railroad use. Such relatively high megacycle frequency, in the order of 160 mc., as well as other practical considerations, make it expedient to employ train-carried radio transmitting and receiving apparatus of an effective operating range which is ordinarily insufficient to provide coverage for the entire territory or length of railroad over which communication with a central office is desired, such as a dispatching or engine division for a railroad. Accordingly, in order to provide the desired coverage, it is contemplated that a plurality of fixed way stations will be located along the railroad at intervals based upon the effective operating range of the train carried equipments, and that these way stations will be connected to the central office for two-way communication by a line circuit, radio link system, or other suitable channel of communication. As illustrated, this channel communication between the central office and all of the way stations in the equipped territory is over a pair of line wires 4, used exclusively for this purpose or jointly with other power, telephone or telegraph facilities, in accordance with the usual practice in the communication field. Also, as shown, the communication over the line wires 4 is provided by a line carrier frequency involving suitable transmitters and receivers for this line carrier frequency located at the central office and at each way station. These transmitters and receivers for the line carrier frequency are of the usual type and construction well known in the art and operate on a suitable carrier frequency for line circuits at the appropriate energy level dependent upon the operating conditions in accordance with well known practice. Since transmitters and receivers for this purpose are well known, and the details of their construction and mode of operation are not material to the invention, such line carrier transmitters and receivers are illustrated diagrammatically in block form. It should also be understood that this line circuit between the central office and the various way stations is provided with suitable terminations, as indicated at 5, and that the line carrier equipment is connected to this line circuit in the appropriate manner, such as by the transformers 6 and blocking condensers 7 or some equivalent shown, in accordance with recognized practice.

The line carrier transmitters and receivers provide two-way communication facilities to and from the central office over what may be considered the wayside communication channel, which may be utilized to cooperate with the radio transmitters and receivers at the way stations and on the trains and provide reception in the central office of radio messages from the trains, and transmission of messages from the central office to the trains. Since the communication to and from the central office is assumed to be on the same line carrier frequency (as shown), and the system is normally in the condition shown for receiving messages from trains, it is necessary to provide additional distinctive control over the line circuit to enable the operator at the central office to set into operation the radio transmitters at the way stations.

Figure 1A:
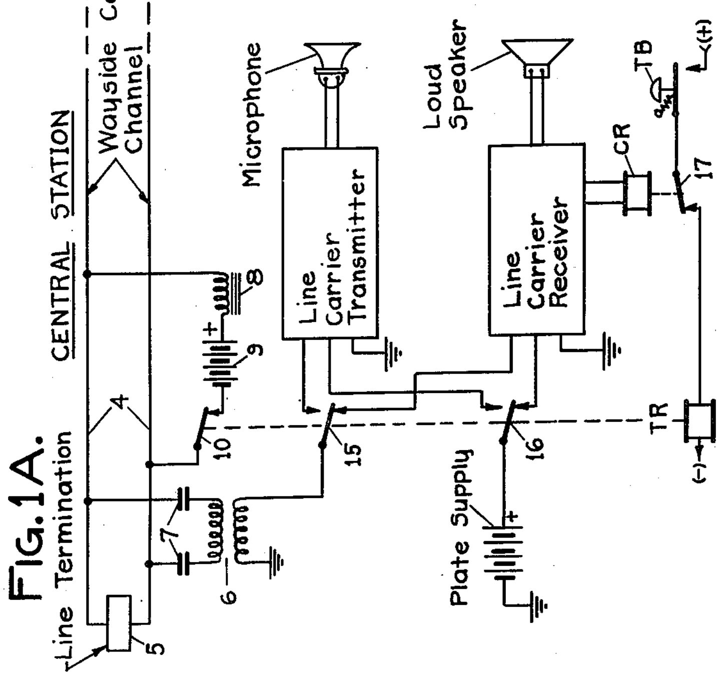

In the embodiment of the invention shown in Figs. 1A and 1B, this manual control by the operator in the central office for transmission of messages to trains is provided by a direct current superimposed on the line circuit, subject to manual control, at the central office, and a relay DC at each way station effectively energized only by sustained direct current. As shown in Fig. 1A, a battery 9 is normally connected across the line wires 4 through a choke or filter 8 to exclude line carrier frequency or the currents of other facilities on the line, this connection including a back contact 10 of a transmit relay TR which may be energized under certain conditions as hereinafter explained by actuation of a talk button TB, foot switch, or the like, operable by the operator at the central office. Referring to Fig. 1B, a direct current relay 2DC is connected across the line circuit in series with a suitable choke 11, or filter.

In connection with a train communication system for railroads, chosen for the purpose of illustrating a specific embodiment of the invention, the communication between the front and rear ends of the same train, between trains, and between trains and the way stations, is provided by a two-way radio telephone system of the usual and well-known space radiation type, employing either amplitude or frequency modulation, and operating on a carrier frequency available for such purpose, presumably in the megacycle band. Since the structure and operation of radio telephone transmitters and receivers of this type are well known in the art, and the particular kind of transmitter or receiver is not material for an understanding of the present invention, no attempt has been made to illustrate the parts and circuits for such transmitters and receivers, which may be assumed to be of any suitable or conventional form, and are conveniently represented by rectangles designated "radio transmitter" and "radio receiver."

Figure 2:
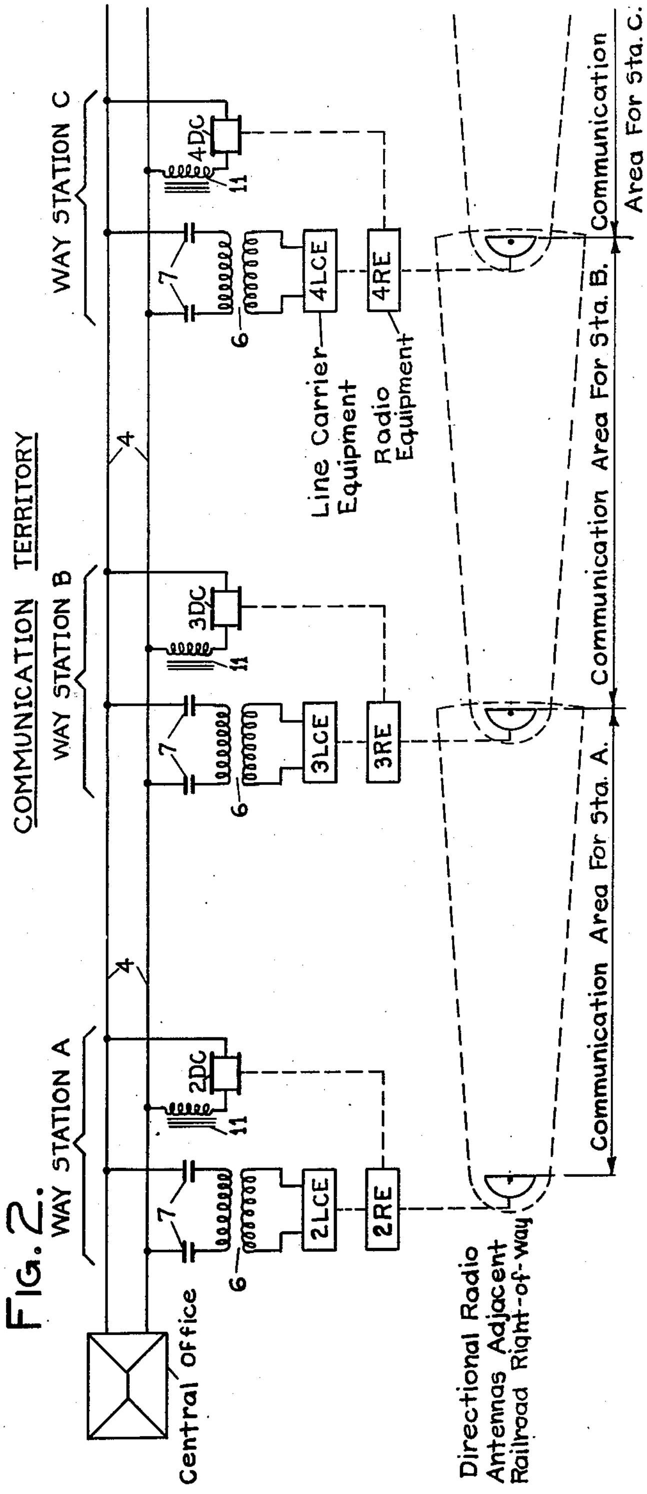
Figs. 2 and 3 are explanatory diagrams illustrating the spacing of way stations on a railroad and the comparable operating range of a typical train-carried equipment.
Figure 3:
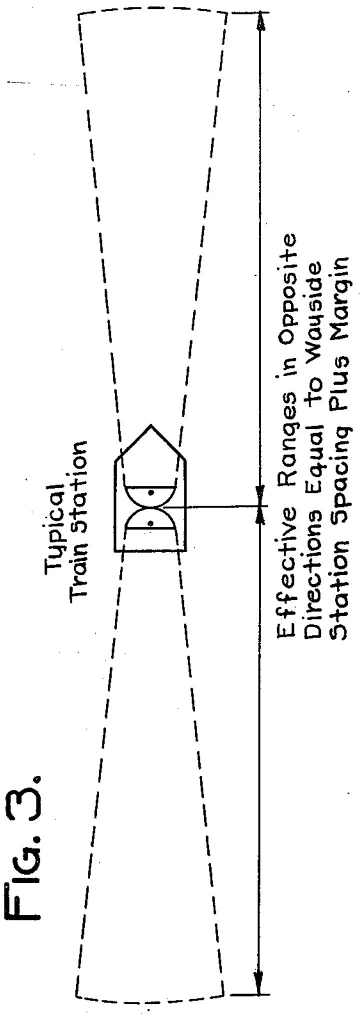

The fixed way stations are preferably provided with directional antennas for transmission and reception, as indicated in Fig. 2, in the manner and for the purposes more fully explained in the prior application of F. B. Hitchcock, Ser. No. 600,359, filed June 19, 1945, Patent No. 2,469,555 granted May 10, 1949. Generally speaking, the field patterns for these way station antennas, indicated by the dash lines in Fig. 2, limit the transmission of messages to the control office to one way station from any train located in the communication area on one side of that way station and extending to the next way station, so that each communication area between successive way stations is in effect covered or served by only one way station. The effective operating range for a train-carried equipment both to the front and to the rear of the vehicle at the front or rear end of the train, assuming directional radiation in the interests of efficiency, as indicated by the field patterns in Fig. 3 is approximately the same as the spacing between the way stations, so that a train station at any point in a communication area is within effective range of the way station serving that communication area. It should be understood that the spacing of the way stations is selected with due regard to the variable range of train stations under different conditions, such as weather conditions and the like, as well as taking into consideration the terrain and other factors affecting radio communication.

The type of communication system assumed provides for communication between the front and rear ends of the same train and between trains; and in order to avoid break-in interference for such communication, any train transmitting a message locks out and prevents transmission from any other train station within range of the first train.

Briefly stated, this spacing of way stations with respect to the operating range of train stations and the directional characteristics of the way station antennas, is employed so that as train stations move along the railroad, any train station within communicating range of any given way station is likewise within range of any other train stations within range of that same way station, and is effective to lock out such other train station against breaking in on any communication to that way station and the central office. For example, the radio station at the front or rear end of a train at any point in the communication area of station A (i. e. between the way stations A and B in Fig. 2) has an operating range to reach all other train-carried stations in this same communication area and capable of reaching the same way station A; and if one of these train-carried stations in this communication area should start communication via the way station A to the central office, its radio signal would reach all other train stations capable of reaching the same way station A and would be available to prevent break-in interference from such other train stations.

Since the trains have limited operating range, and the equipped territory may include a plurality of communication areas corresponding with such range, it can be readily seen that when a given train in one communication area is transmitting a message to its nearest way station and to the central office, other trains in other communication areas are out of direct range, and without additional control, would be able to break-in unknowingly upon the communication to the central office and mutilate or interfere with the message. The present invention is directed more particularly to the prevention of such break-in interference, and to do so without preventing non-interfering radio communication between trains in other communication areas.

Referring to Fig. 2, it will be seen that the directional radio antennas are all pointed in the same direction, but this is to be understood to be the same general direction since railroads and other vehicular lines of traffic do not always travel in exactly straight lines. For convenience in the disclosure, the communication area assumed to be within range of any particular station has been indicated by a suitable arrow and appropriate legend, and is shown as extending from what might be defined as an advantageous point of reception adjacent one directional antenna up to a point of advantageous reception from the directional antenna of the next way station. Since directional antennas are not perfectly asymmetric, it will be appreciated that this point of advantageous communication with respect to each antenna is actually a limited zone adjacent that way station antenna.

As above pointed out, either amplitude or frequency modulation may be employed. However, the provision of frequency modulation has certain advantages because of its station discriminating characteristics. It is well understood that a radio receiver of the frequency modulation type is capable of maintaining reception from that station which has the highest signal strength to the exclusion of other stations having a lesser signal strength although transmitting on the same carrier frequency channel. In the situation where two stations are transmitting on the same carrier frequency and are being received at the same time by a receiver, that station which has the higher signal strength is received in preference to the other due to the characteristics of the limiter stage in a frequency modulation type of radio receiver. This selectivity characteristic usually operates to a marked degree whenever the signal strength for the two transmitting stations as received at the receiver is in the ratio of two-to-one, but such characteristic is still somewhat effective even when smaller ratios are involved. Thus, it will be appreciated that the passage of a train station from the effective radio field or communication area of one station to another will receive one station in preference to the other on each side of a point of equal signal intensity of the two stations. But since a frequency modulation receiver tends to maintain reception of the station last tuned in while the signal intensity is still sufficient to be effective, the actual point of changeover from one station to the other may vary from the point of equal radio signal intensities. Since the train under such circumstances will be moving, it is believed that the change from one communication area to another will be practically unnoticed especially since the transmission from all wayside stations is the same message from the central office. Various other characteristics of a frequency modulation radio communication system are particularly adaptable to this type of organization.

In Fig. 2, the radio equipments have generally been designated RE and each includes a radio transmitter and receiver as more specifically shown in Fig. 1B for the typical way station A. These equipments are governed by the office controlled relays DC to determine when the normal condition for reception is changed to a condition for transmission. Each radio equipment has associated therewith the line carrier equipment designated LCE in Fig. 2 and including a line carrier transmitter and a line carrier receiver as more specifically shown in Fig. 1B.

Each of the way stations are assumed to be alike, so that the description of the apparatus and organization of a typical way station will be sufficient for an understanding of all of the way stations. It might be noted, however, that the way stations illustrated in Fig. 2 have their different devices designated by letter reference characters made distinctive by the use of the preceding numerals 2, 3 and 4 for the respective way stations A, B, and C.

Referring to Fig. 1A, the equipment in the central office includes the "line carrier transmitter" having a microphone associated therewith, a "line carrier receiver" having a loud speaker and a carrier operated relay CR associated therewith, a push-to-talk button TB, and a transmit relay TR. The transmit relay TR is normally deenergized, so that the line carrier receiver is normally connected to the line wires 4 through back contact 15 of relay TR and through the coupling transformer 6 and blocking condensers 7. Another contact 16 of relay TR serves to connect a source of plate potential to the line carrier receiver to render it active for reception. When the transmit relay TR is energized, then the back contact 16 is opened to render the line carrier receiver inactive and the front contact 16 is closed to render the line carrier transmitter active; and at the same time the contact 15 disconnects the line carrier receiver and connects the line carrier transmitter to the coupling transformer 6 rendering the line carrier transmitter effective for the transmission of a voice message spoken into the microphone.

The energization of the transmit relay TR is effected by the actuation of the talk button TB, which is of the self-restoring type, but when actuated connects (+) through back contact 17 of the carrier responsive relay CR to the transmit relay TR to cause it to pick up its contacts. Of course, if the line carrier receiver is receiving a carrier signal, then the carrier responsive relay CR is picked up, so that the operator cannot effect the energization of the transmit relay TR. However, assuming that the relay TR can be effectively picked up, then its back contact 10 is opened, removing energy from the line circuit formed by the line wires 4, which results in the deenergization of the office controlled relays DC at the several way stations, as for example, relay 2DC of way station A in Fig. 1B. This office controlled relay 2DC governs the radio equipment at the way station, as will be presently described, it being sufficient for the present to know that these relays DC for the several way stations are connected in multiple through their respective chokes 11 to the wayside line wires 4 and are normally supplied with direct current from the battery source 9 in the central office through back contact 10 of relay TR. The choke 8 is included, in series with the battery source 9 for the purpose of preventing this application of direct current to the line wires 4 from becoming a short circuit to the carrier signals impressed upon the wayside communication channel by any one of the line carrier transmitters. It is, of course, obvious that this is essential because the line carrier receiver at the central office must be capable of receiving a message transmitted from a line carrier transmitter anywhere in the territory regardless of the normal application of direct current to the wayside line wires. The chokes 11 at the various way stations are provided for the same reason.

Referring to Fig. 1B, illustrating a typical way station equipment, conveniently designated way station A, the radio receiver is normally connected to the directional antenna through front contact 18 of relay 2DC. Also, the radio receiver is rendered active by reason of the connection of its plate supply through front contact 19 of relay 2DC. On the other hand, if a message is to be transmitted from each way station, the operator at the central office actuates the talk button TB which results in the removal of direct current from the wayside line wires 4 thus deenergizing all of the office controlled relays DC to render the various radio transmitters active and the associated receivers inactive. Specifically, at the typical station A, this results in the deenergization of relay 2DC disconnecting the antenna from the receiver and closing its connection through back contact 18 to the associated radio transmitter. Similarly, the closure of back contact 19 connects the plate supply to the radio transmitter after removing it from the radio receiver. In this way, the radio receiver is normally rendered active or effective to receive a radio message, but can be selectively rendered inactive and the associated radio transmitter rendered active subject to the manual control of the operator in the central office.

It might be noted here, that the tubes of the radio transmitters and radio receivers as well as the line carrier transmitters and the line carrier receivers, are assumed to be continually lighted, so that the selective switching operation of these different devices can effect their immediate response rather than waiting for the time necessary for the heating of the various vacuum tubes involved.

Normally, the coupling transformer 6 is connected through back contact 20 to the line carrier receiver, and the plate supply is connected through back contact 21 so as to render such line carrier receiver effective for the reception of a message transmitted from the central office over the wayside communication channel. The reception of the line carrier signal itself causes the energization of a carrier responsive relay 2CR, while the voice messages imposed upon the carrier current are demodulated to give an audio output, which, as indicated by the wire 22, is transferred to the radio transmitter in such a way as to be used for the modulation of the radio carrier frequency signals transmitted by the radio transmitter assuming, of course, that it is rendered active by the deenergization of the relay 2DC.

On the other hand, if a radio signal is being received, it may not only be modulated by the voice message, but also by distinctive tone of a suitable character that does not interfere with the voice message. This distinctive tone is passed through the band pass filter indicated, and rectified by a suitable rectifier unit 2R, the output of which passes through the back contact 23 of the carrier responsive relay 2CR for the energization of the transmit relay 2TR. In other words, if a radio signal is received having the distinctive tone thereon, the transmit relay 2TR is energized and its contacts picked up to render the associated line carrier receiver inactive and the associated line carrier transmitter active. The voice message frequencies are passed through a suitable connection indicated by wire 24 to the input of the line carrier transmitter to effect the modulation of the line carrier frequency that is imposed upon the wayside communication channel. Suitable filter apparatus 25 is employed to prevent the distinctive tone from being passed over connection 24 to the line carrier transmitter.

In brief, it can be seen that the audio output circuit of the radio receiver indicated by wire 24 goes to the line carrier transmitter and similarly that the audio output circuit of the line carrier receiver is connected to the radio transmitter. This is so that the audio components of the voice messages received by either receiver can act upon the radio carrier frequency in the case of the radio transmitter and the line carrier frequency in the case of the line carrier transmitter to modulate such frequencies in such a way that the message received at the way station will be transmitted away from that way station by the proper associated transmitter.

For the purpose of simplicity, it may be assumed that the modulated radio carrier frequency signals are received and amplified and converted into audio frequencies in the same manner as a conventional radio receiver, and that this audio frequency, instead of operating a loud speaker, acts (like a microphone) to modulate the frequency transmitted by the line carrier current transmitter, although it should be understood that any other suitable expedients may be employed in this connection.

There are certain interlocks and conditions under which the respective messages may be transmitted and received as will be more particularly pointed out hereinafter, it being sufficient for the present to understand that the central office may be effective to transmit a message to all of the way stations which are respectively effective to transmit corresponding radio messages. Also, the reception of a radio message for the office at any particular way station throughout the communication territory, results in the retransmission of that message over the wayside communication channel for reception at the central office. In this connection, it may be noted that the message imposed upon the wayside communication channel by the line carrier transmitter of any way station is also received at all other way stations, but at such other way station it is ineffective to operate the radio transmitters, since at this time the radio transmitters cannot be effective due to the energized condition of their associated office controlled relays DC. However, the reception of such carrier signal at each of the various other way stations causes the energization of their carrier responsive relays corresponding to relay 2CR of the typical way station of Fig. 1B, opening back contact 23 at those various way stations. Thus, in the event of the reception of a radio signal at any one of such other way stations from some mobile unit also endeavoring to transmit a message to the central office, the transmit relay at that station cannot be picked up and cause a carrier signal to be transmitted interfering with the message already on the wayside communication channel. In this way, the wayside stations are so interlocked that the first way station receiving a radio signal having the distinctive tone imposed thereon, gains control of the wayside communication channel to the exclusion of the other wayside stations and thus prevents possible interference from some other station.

It might be noted in this connection that the reception of a message at the central office is received by the line carrier receiver and demodulated to be reproduced by the conventional loud speaker, while the carrier frequency itself is effective to cause the energization of the carrier responsive relay CR opening back contact 17. This prevents the central office operator from interrupting the reception of a message.

Figure 4:
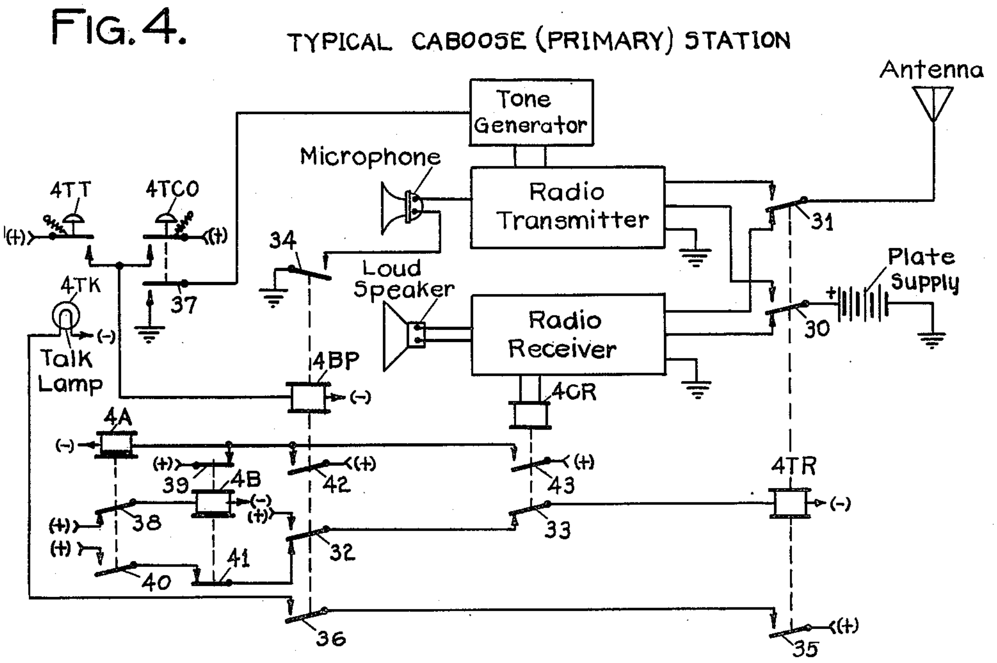
Fig. 4 illustrates conventionally and diagrammatically the parts and circuits constituting the equipment for a typical primary station on a train, such as the caboose of a freight train.

*Typical primary station.*—Referring to Fig. 4, a typical caboose or primary station has been diagrammatically illustrated as including a radio transmitter and a radio receiver. The radio receiver has the conventional loud speaker connected to its output, and also a carrier responsive relay designated 4CR which is picked up by the reception of a carrier signal regardless of whether it is modulated or not. Normally, the radio receiver is rendered active by reason of its connection to the plate supply through back contact 30 of relay 4TR, and also by its connection to its associated antenna through back contact 31 of this same relay 4TR.

When the transmit relay 4TR is picked up, either as a result of manual control, or for the transmission of check pulse, the radio receiver is rendered inactive, and the radio transmitter is rendered active. This is because the plate supply is connected through front contact 30 to the radio transmitter and the antenna is also shifted by contact 31 to the radio transmitter.

A talk button 4TT is for establishing communication between the caboose station and another train or its associated locomotive station; whereas the talk button 4TCO is for establishing communication between the caboose station and the central office via some way station. Both of these buttons are of the self-restoring type and the actuation of either button causes the energization of the associated button repeating relay 4BP by an obvious circuit.

The picking up of the relay 4BP closes a circuit from (+), through front contact 32 of relay 4BP, back contact 33 of carrier responsive relay 4CR, windings of transmit relay 4TR, to (−). This energization of the transmit relay 4TB renders the radio transmitter active, and since the button repeater relay 4BP closes a front contact 34, the microphone is rendered effective for the transmission of a voice message. The trainman is advised that it is proper for him to talk, namely, that his transmitter is rendered active, by reason of the illumination of the talk lamp 4TK by reason of a circuit closed from (+), and including front contact 35 of relay 4TR, front contact 36 of relay 4BP, through lamp 4TK, to (−).

If the trainman desires to talk with the central office, as above mentioned, he actuates the talk button 4TCO instead of the button 4TT, which in addition to energizing the repeater relay 4BP, also closes back contact 37 to cause operation of the tone generator associated with the radio transmitter. This tone generator is assumed to be of any suitable electronic type which will produce a tone preferably of the supersonic range that will not interfere with regular voice transmission and reception over the radio carrier signal. However, it should be understood that since the frequencies required to transmit voice messages may include only the limited range between 500 and 2,500 cycles per second, it may be feasible to employ some frequency which is not supersonic but which is filtered away from the voice message circuits at the receiving station. In any event, this distinctive tone, regardless of its frequency, is superimposed upon the radio frequency signal in addition to the voice modulating audio frequencies, and is filtered out by a suitable band pass filter at the receiving wayside station for the purpose of actuating a tone responsive transmit relay at such station, as previously described.

The release of either talk button which has been actuated, will restore the primary station to its normal condition in which it is intermittently transmitting check pulses. More specifically, two pulsing relays designated 4A and 4B are employed to provide the timing characteristics for the intermittent transmission of these check pulses. As indicated in the drawings, the relay 4B is energized through back contact 38 of relay 4A and its front contact 39 is energizing relay 4A which has not yet responded to such energization. As soon as relay 4A responds to its energization, a circuit is closed for the transmit relay 4TR from (+) and including front contact 40 of relay 4A, front contact 41 of relay 4B, back contact 32 of relay 4BP, back contact 33 of relay 4CR, windings of transmit relay 4TR, to (−). This energization of relay 4TR causes the radio transmitter to transmit a check pulse signal without modulation sinces the front contact 34 of relay 4BP is open; and this check pulse persists only for a short interval of time measured by the release of the relay 4BP and the release of the relay 4TR. In other words, as soon as the relay 4A is picked up, it opens back contact 38 to deenergize the relay 4B which immediately opens front contact 41 to release the transmit relay 4TR to end the check pulse transmitted. The length of the check pulse may be suitably selected in accordance with the various operating times for the relays involved in the complete system organization, but it is contemplated that the duration of such pulse will be in the order of a half second or the like. The release of the relay 4B, of course, deenergizes the relay 4A, which is slow to release for a suitable period to determine the spacing between successive check pulses. This release period of the relay 4A may be of any suitable time, but is contemplated as being in the order of three to four seconds, at the termination of which back contact 38 will be closed for picking up the relay 4B and initiating another check pulse. It will, of course, be appreciated that any suitable times may be employed in these relays so as to give the desired length check pulses with the desired spacings, but it has been found practical to employ check pulses of approximately a half second duration with spaces between pulses of approximately 3½ seconds.

These check pulses transmitted by the typical caboose or primary station, are received by the associated secondary station to provide a check on the communication between the primary and secondary stations as will be discussed in greater detail presently. It is desired to point out here that this intermittent operation of these pulsing relays 4A and 4B is arrested by the actuation of either talk button 4TT or 4TCO, since the energization of the button repeating relay 4BP closes front contact 42 to maintain relay 4A energized throughout the transmission from this primary station. This, of course, leaves the relay 4B deenergized so that upon the termination of the transmission of a message, a time interval corresponding to the usual length of spaced between successive pulses is imposed upon the pulsing organization before the first check pulse is transmitted. As will be presently explained, this provides a suitable control for restoring the check lamp at the associated secondary station.

It should also be noted that a similar operation occurs following the reception of a radio message either from a secondary station or from a wayside station within the communication area in which the primary station is then located. This is because the reception of a radio signal causes the carrier responsive relay 4CR to be picked up closing front contact 43 to maintain the pulsing relay 4A energized, the same as during transmission under manual control. A similar organization of check pulse control has been shown and described in my prior application Ser. No. 580,224 filed February 28, 1945, now Patent No. 2,408,878 dated October 8, 1946, and no claim to this subject matter is intended to be included in this application.

Figure 5:
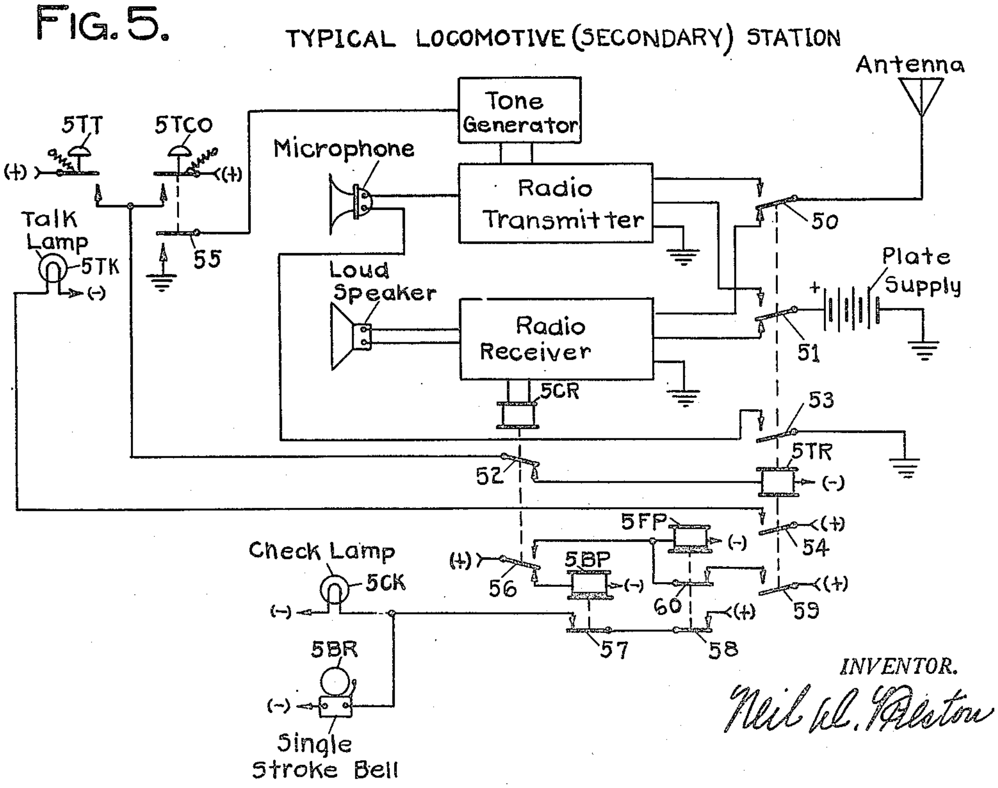
Fig. 5 illustrates diagrammatically and conventionally the parts and circuits for a typical secondary station on a train, such as on the locomotive or other motive unit at the head end of the train, and from which the operation of the train is controlled.

*Typical secondary station.*—A typical locomotive or secondary station organization has been shown in Fig. 5 as including a radio receiver and a radio transmitter. The radio receiver is provided with the conventional load speaker connected to its output circuit and is also provided with a carrier responsive relay 5CR in a similar manner as explained in connection with the radio receiver of Fig. 4. The radio transmitter has a conventional microphone provided for modulating its radio frequencies signal, and also an associated tone generator with the same characteristics and for the same purposes as explained in detail in connection with Fig. 4.

The radio receiver is normally active because the antenna is connected thereto through back contact 50 of relay 5TR, and the associated plate supply is connected through back contact 51 of relay 5TR. However, the actuation of either the transmit button 5TT or the transmit button 5TCO results in the energization of the transmit relay 5TR through a circuit including back contact 52 of relay 5CR; and this energization of relay 5TR renders the radio receiver inactive by opening back contacts 50 and 51 and renders the associated radio transmitter active by the closure of front contacts 50 and 51. The closure of front contact 53 of the transmit relay 5TR renders the microphone effective at the same time that the radio transmitter is rendered effective. Also, the closure of front contact 54 energizes the talk lamp 5TK to advise the operator or trainman that his transmitter is ready for a voice message.

The transmit button 5TT is for communication with the primary station or other trains as the case may be, whereas the actuation of the talk button 5TCO is for establishing communication with the central office by the way of the particular wayside station within the communication area in which the train is then located. This is effected by the closure of back contact 55 of the talk button 5TCO which renders the tone generator active to cause a distinctive tone to be superimposed upon the radio carrier signal for rendering the associated wayside radio receiver effective to act upon its associated line carrier transmitter, as previously explained.

Under normal conditions, the typical locomotive station is within range of its associated caboose station and is intermittently receiving the check pulses above explained. Between the successive check pulses, the closure of back contact 56 energizes the back contact repeater relay 5BP through an obvious circuit; whereas the reception of a check pulse causes the carrier relay 5CR to be momentarily picked up to energize the front contact repeater relay 5FP. The back contact repeater relay 5BP is just slightly slow acting, i. e. sufficiently to maintain its contact 57 picked up during the reception of the usual length check pulse. On the other hand, the front contact repeater relay 5FP is sufficiently slow releasing to remain picked up between successive check pulses with a suitable margin, but, of course, this relay will drop away if the carrier responsive relay 5CR is deenergized for a period substantially greater than the time interval between check pulses. Thus, the intermittent operation of the carrier responsive relay 5CR maintains both of the relay 5FP and 5BP picked up which completes an energizing circuit from (+) through front contact 58 of relay 5FP, front contact 57 of relay 5BP, check lamp 5CK and windings of bell 5BR in multiple to (−).

During the reception of a message either from the primary station or the then associated wayside station, the carrier responsive relay 5CR is picked up which maintains the front contact repeater relay 5FP picked up, but allows the back contact repeater relay 5BP to release and extinguish the check lamp 5CK and cause the single bell 5BR to sound. Immediately following such warning, the operator expects to hear a voice message through the medium of the loud speaker, and the failure to receive such a message advises him of some failure in the communication system.

At the termination of the reception of a message, there is a cessation of the carrier signal for a time period corresponding to the usual space between successive check pulses, which is sufficient to release the relay 5CR and reenergize the back contact repeater relay 5BP. Since the pickup period of the relay 5BP is relatively quick, although the relay is slightly slow releasing, the check lamp 5CK is immediately illuminated at the termination of the reception of a voice message.

During the transmission of a message from the locomotive or secondary station of Fig. 5, there are no check pulses received since the carrier signal transmitted from this secondary station causes the transmission of check pulses to cease at the primary station, and also because the secondary station could not receive check pulses during its transmission even if such check pulses were available. Thus, the carrier responsive relay 5CR remains deenergized closing back contact 56 to maintain the back contact repeater relay 5PB picked up, but, of course, the front contact 56 is open and would allow the front contact repeater relay 5FP to become deenergized. However, under these conditions the check lamp 5CK should remain illuminated since there is no message being received. To accomplish this, a stick circuit is provided for the front contact repeater relay 5FP closed from (+) and including front contact 59 of relay 5TR, front contact 60 of relay 5FP, winding of relay 5FP, to (−). Thus, as long as the transmit relay 5TR is picked up during the transmission from the secondary station, the front contact repeater relay 5FP is maintained energized along with the back contact repeater relay 5BP. This maintains the check lamp 5CK illuminated by reason of its obvious energizing circuit.

With this understanding of the general organization and functioning of the system, it is believed that further characteristic features of the system will be best understood by considering different operating conditions encountered in the application of the present invention to a railway.

*Typical system operations*

*Normal conditions.*—As previously explained in connection with Figs. 1A and 1B, and also referring to Fig. 2, the wayside stations are normally in a condition for the reception of radio signals because the central office normally assumes an inactive condition. The various train stations, such as a typical caboose or primary station and at associated typical locomotive or secondary station, may be moving anywhere within the communication territory, and each station will be located within the communication area of at least one wayside station for reasons previously explained in connection with Fig. 2.

These various train stations or mobile stations are also normally conditioned for the reception of radio signals, but the primary train stations will, of course, be transmitting their check pulse signals at spaced intervals. Since the check pulses are of relatively short duration and the spaces between the pulses is substantial, each primary station is in condition to receive more than half of the time so that transmission from a wayside station would, of course, immediately break in upon the intermittent transmission of check pulses from the primary stations, in a manner presently to be discussed in greater detail. It is desired to note, however, that this transmission of check pulses from each primary station is effective to maintain the check lamp at its associated secondary station illuminated.

These check pulses transmitted by each primary station will also be received by the adjacent wayside station but will not be effective to cause operation of the associated line carrier transmitter since these check pulse signals are not modulated by the distinctive tone required to render the line carrier transmitter of a wayside station active. With this organization, it is then apparent that even though there may be a plurality of primary train stations located in different communication areas throughout the communication territory, and even though such primary train stations may be transmitting check pulses at different intervals out of synchronism, they cannot prevent the central office from rendering all of the wayside stations effective to transmit at the same time whenever the operator at the central office desires.

It might be noted also that if two or more primary train stations are within range of each other, the fastest operating check pulse apparatus acts to synchronize the check pulses apparatus at the other primary train stations in such a way that this relatively fast operating primary train station is the only one within its particular range which transmits check pulses. This is because the fast operating check pulse transmitting apparatus places each check pulse carrier signal on the air which is received at each of the other stations closing the front contacts 43 for each pulse prior to transmission of a check pulse signal from that station. This acts to maintain the relay 4A energized and prevent such apparatus from transmitting a check pulse of its own. This feature of self-synchronization between the different primary stations has been disclosed and described in detail in my above mentioned prior application Ser. No. 580,224 filed February 28, 1945, now Patent No. 2,408,878 dated October 8, 1946, so that no claim to this subject matter is intended to be included in this application.

*Transmission from central office.* — Let us assume that the operator in the central office desires to transmit a message to any one or several of the train stations within the communication territory. To do this, he actuates the talk button TB (see Fig. 1A) in the central office which energizes the transmit relay TR and opens back contact 10 to remove direct current energy from the line wires 4 as supplied by the battery 9. This removal of direct current energy from the line wires 4 causes the deenergization of the office controlled relays 2DC, 3DC, 4DC, etc., as shown in Figs. 2 and 1B, which renders the radio transmitters at each of the several stations effective for the transmission of messages.

As soon as a way station has its radio transmitter rendered active, its carrier frequency signal is transmitted so that it is received by each of the train stations within its communication area. This causes the energization of their respective carrier responsive relays, such as relays 4CR and 5CR of Figs. 4 and 5, to lock out or prevent such mobile train stations from transmitting. In addition to this lock-out operation, the picking up of the carrier responsive relay 4CR at a primary train station acts to cause the cessation of the check pulse transmitting apparatus at that station; and also at each secondary train station the continued energization of the carrier responsive relay 5CR results in the extinguishment of the associated check lamp 5CK and the sounding of the associated single stroke bell 5BR.

With these conditions established, the communication organization is now in condition for the operator at the central office to transmit any message he may desire by speaking into the microphone. This message is transmitted to each of the several way stations by modulating the line carrier frequency which is received at each of the several way stations and is demodulated by their respective line carrier receivers. The audio output of each line carrier receiver is transferred or fed to its associated radio transmitter to cause the modulation of the radio carrier frequency signal being transmitted. Since this operation occurs at each of the several wayside stations, it is apparent that every mobile train station located within the communication territory will receive the message. It is also assumed that the operator begins the message transmission immediately following the actuation of his associated talk button TB, so that there will be no substantial gap following the extinguishment of the check lamps CK at the variou secondary train stations and the reception of messages at such stations.

As soon as the operator at the central office completes his message, he releases the transmit button TB which renders the associated transmitter inactive and also reapplies direct current from the battery 9 to the line wires 4. This reestablishes normal conditions at each of the wayside stations causing a cessation of the transmission of a carrier frequency signal from such stations. This allows each primary train station to initiate transmission of check pulses after a time interval equal to the regular time interval or space between successive check pulses. This, of course, causes the check lights at each of the secondary train stations to be restored immediately upon the cessation of the reception of the wayside carrier signal.

*Transmission from primary station to central office.*—Let us assume that the trainman at a primary train station desires to communicate with the central office. To do this, he actuates the talk button 4TCO assigned to this purpose instead of the talk button 4TT intended to initiate transmission to another train station (see Fig. 4). This actuation of the talk button 4TCO closes back contact 37 to render the tone generator associated with the radio transmitter in condition for modulation of the radio carrier frequency with a distinctive tone frequency as soon as the radio transmitter is rendered active by the transmit relay 4TR. With reference to Fig. 4, it can be seen that the actuation of the transmit button 4TCO causes the energization of the repeater relay 4BP which in turn causes the energization of the transmit relay 4TR as previously explained. The closure of front contact 34 of relay 4BP renders the microphone effective, and the closure of front contact 42 arrests the operation of the pulsing relays 4A and 4B. As soon as the transmit relay 4TR is picked up, the radio carrier frequency signal is transmitted; and this carrier signal is modulated with the distinctive tone so that a distinctive signal is received by the particular wayside station next adjacent as well as any mobile train stations within receiving range. The energization of both of the relays 4BP and 4TR causes the illumination of the talk lamp 4TK so that the trainman is advised that the system is in readiness for transmission of his message.

At each of the secondary train stations, within range of the particular primary station then transmitting, the check lamp such as lamp 5CK, is extinguished and the station is in a condition for the reception of any message that is spoken into the microphone at the primary train station. Also the reception of the carrier frequency signal at such secondary train station locks out that station by opening back contact 52 of the carrier responsive relay 5CR so that the trainman thereat cannot interfere with the communication already initiated by the primary train station.

It should be understood, that all train stations beyond receiving range of the primary train station then transmitting are in no way affected; and if desired, separate communication between such stations can be independently carried on, as will presently be discussed.

The reception at the adjacent wayside station (such as the typical station of Fig. 1B) of the carrier signal with the distinctive tone superimposed thereon as transmitted from the primary train station is effective to cause a current of the distinctive tone frequency to pass through the band-pass filter 26 which is rectified by the associated rectifier 2R to cause the energization of the transmit relay 2TR at such way station. This energization of the transmit relay 2TR, of course, renders the associated line carrier receiver inactive and the associated line carrier transmitter active for transmitting a line carrier frequency signal over the wayside communication channel. The reception of such line carrier signal at the central office and at each of the other wayside stations causes the picking up of the associated carrier responsive relays and prevents any transmission from either the central office or any wayside station.

For example, it is apparent that the picking up of the relay CR at the central office opens back contact 17 and prevents the operator at the central office from energizing the transmit relay TR. Similarly, if it is assumed that some other wayside station is transmitting a line carrier signal, and the typical way station A of Fig. 1B is receiving such line carrier signal, it will be apparent that the energization of the relay 2CR opens back contact 23 and prevents the transmit relay 2TR from being energized even though some train station within its communication area should transmit a radio carrier frequency signal with the distinctive tone superimposed. In other words, the transmission of a radio carrier frequency signal modulated with a distinctive tone by a first train station in one communication area results in the transmission of a line carrier frequency signal by the associated wayside station to the central office and to each of the other wayside stations. This prevents a second train station in any other communication area, and not directly receiving from the first train station, from interfering with the transmission of a message to the central office by the first mentioned train station. In the case under consideration, the first train station is assumed to be a primary train station, but the same operations and conditions exist with respect to secondary train stations.

Assuming that the operator or trainman, at the primary train station being considered, transmits his message by speaking into the associated microphone, it will be received only by the train stations within range and by the wayside station within the communication area of which it is then located. When the message is received at the way station, the radio receiver at that station acts to demodulate the received signal and pass the audio output through the low-pass filter 25 and connection 24 to the associated line carrier transmitter (see Fig. 1B). The filter 25 will be of a suitable character, such as a low-pass filter to allow only the audio message to pass to the line carrier transmitter for modulation of its output and transmission to the central office, where it is received and is again demodulated and reproduced in the loud speaker. The low-pass filter 25 prevents the distinctive tone transmitted by the primary train station (or secondary train station) from passing through the connection 24 to the line carrier transmitter. As previously mentioned, this tone may be suitably selected above the audio frequencies employed for voice transmission and filtered out of the voice reproduction circuits without interfering with the voice message.

At the end of the message, the primary station, of course, restores to its normal condition for the transmission of check pulses, and the removal of a radio carrier frequency signal with distinctive tone frequency at the receiving way station, of course, allows its tone responsive relay such as relay 2TR to restore the wayside equipment to its normal condition.

Since communication with the central office by one train station locks out all others in the manner just described, it may happen that a train station in one communication area will endeavor to transmit to the central office while a train station in another communication area is already using the wayside communication channel, but, of course, will receive no indication of this fact. For this reason, it may be expedient for a train station to first call the central office for permission to transmit its message. The transmission of a permission message by the central office for a particular train station to proceed to transmit will, of course, be received by all train stations and thus advise them to desist from endeavoring to use the wayside communication channel. With such a procedural setup, it may also be desirable for the central office to transmit a line-clear message when a particular train station has completed the transmission of its message, thus advising all train stations that the wayside communication channel is again clear. It is, of course, to be understood that any desired procedures may be followed in employing the present invention in actual practice.

*Transmission of secondary station to central office.*—Assuming that a trainman at a secondary train station, such as typically shown in Fig. 5, desires to communicate with the central office, he similarly actuates the talk button 5TCO instead of the associated talk button 5TT provided for communication between train stations. This conditions the tone generator by the closure of back contact 55 and energizes the transmit relay 5TR directly. This transmit relay 5TR closes front contact 53 to render the associated microphone effective as well as closes front contact 54 to render the talk lamp 5TK illuminated. The transmission of the radio carrier frequency signal modulated with the distinctive tone frequency from this secondary train station is, of course, received at the adjacent wayside station and any other train station within range. At the train stations that may be within range the carrier acts to lock out such station and also at the primary train stations acts to stop the check pulse transmitting operation. This is necessary so as to prevent any interference by check pulses with the message to be transmitted to the central office via the wayside station.

The reception of such carrier signal with the distinctive tone superimposed thereon, of course, causes the proper response of the tone responsive relay at the wayside station to render the line carrier transmitter effective, as previously described. It is also believed unnecessary to point out in detail about the various conditions of transmission and reception since these operations are the same as previously described in connection with the transmission of a primary station to the central office. The particular point to note is that during such transmission from a secondary station, its check lamp 5CK is maintained illuminated by reason of the stick circuit previously pointed out as including front contact 59 of the transmit relay 5TR. The cessation of transmission from the secondary station is, of course, effective to restore the communication organization to its normal conditions.

*Transmission between train stations.*—It is, of course, apparent that it will be desirable to transmit messages between the various train stations. In some cases, this transmission will be between the primary and secondary train stations associated with a particular train, and in other cases the transmission may be from the primary or secondary train station of one train to the train stations of one or more other trains. In any event, the transmission from a train station is effected by actuating the talk button 4TT in the case of the typical primary train station of Fig. 4 or the talk button 5TT in the case of the typical secondary train station of Fig. 5. In either case, the train station is rendered active to cause the transmission of a carrier signal without having the distinctive tone superimposed thereon. Otherwise, the operation of the train station is the same as previously described. It is noted that the carrier signal transmitted by the train station in either case is received by all other train stations within range and acts under such circumstances to lock those stations out and at any primary station to render the check pulse transmitting means inactive. If it is a primary station that is transmitting, the check pulse transmitting means is locally rendered ineffective as previously described; whereas if the station happens to be a secondary train station, the check lamp is maintained illuminated by reason of the action of the transmit relay on the associated front contact repeating relay such as 5FP.

The important feature involved in this inter-train communication is the absence of any distinctive tone upon the radio carrier signals transmitted for communication between the train stations, which results in no action at the adjacent wayside station, because there is no tone to act upon the tone responsive transmit relay at such way station. In other words, the radio carrier signal may be received at a wayside station, but its message is not repeated to the wayside communication channel, and thus it does not interfere with the communication to the central office by some train station in a different communication area.

It may happen that communication will be in progress between mobile stations in one or more of the communication areas, or communication between mobile units may occur in succession in overlapping relationships in different communication areas, in such a way that it would be difficult for the central office to gain control of the communication system for issuing important instructions if it were not for the fact that such local communication between mobile units does not lock out the central office. For example, a mobile train station may be transmitting to another mobile train station while located in the communication area for station B (see Fig. 2), but this does not prevent the central office from transmitting a message from each of its way stations, which message could be properly received in the communication area for station A and each of the other communication areas except in the communication area for station B where the mobile train station is transmitting. In this case, there would be interference in the communication area for station B, but as soon as the mobile train station ceased transmitting, the central office would also gain control of that communication area. In brief, the central office is made superior to the mobile stations so that it can more readily gain control of the communication facilities in spite of local transmission between mobile stations.

Figures 6A, 6B:
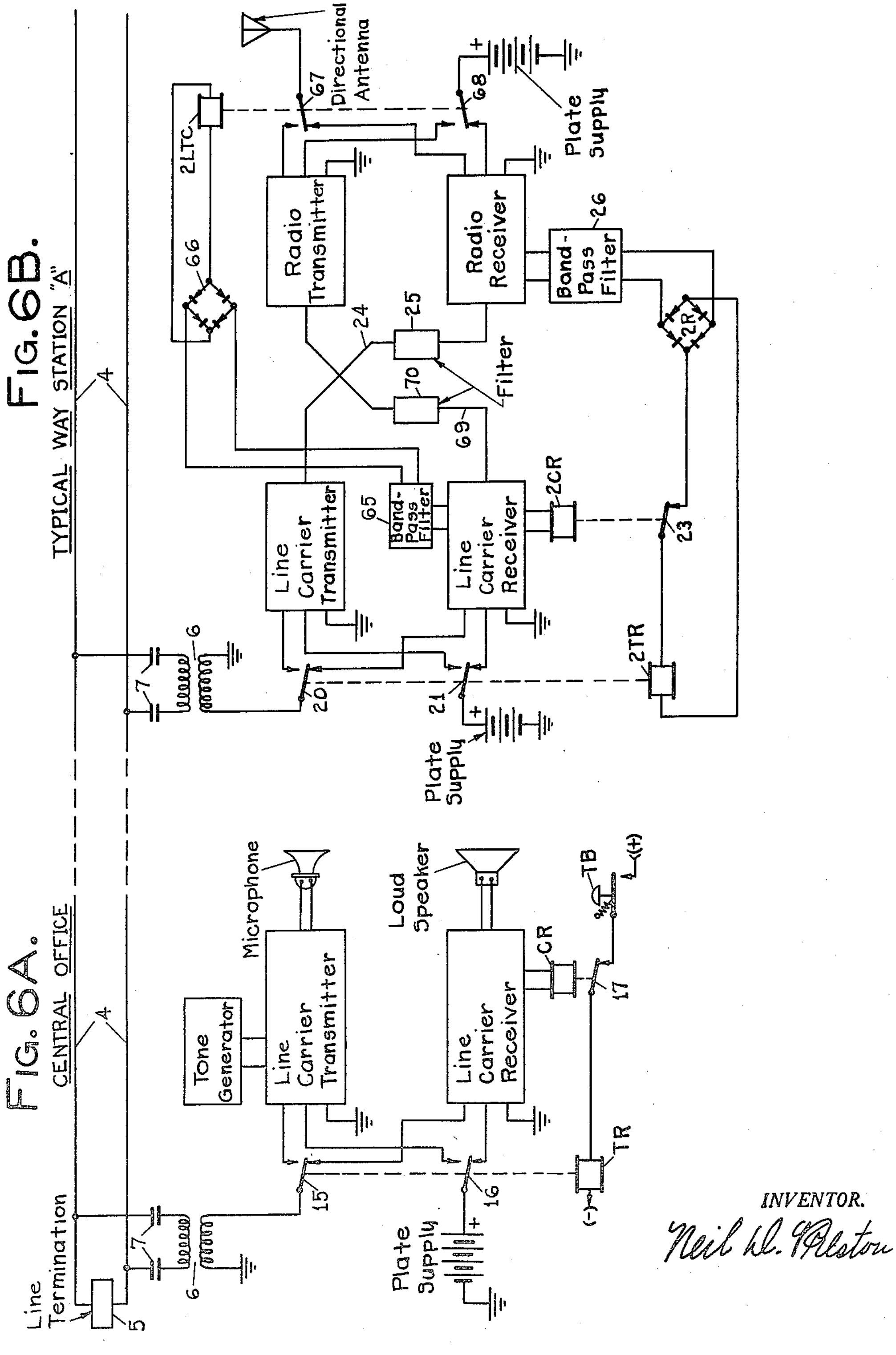
Figs. 6A and 6B are similar to Figs. 1A and 1B, and illustrate a modified form of control from the central office over the line circuit for initiating transmitting operation from the various way stations.

*Modification of Figs. 6A and 6B.*—With reference to Figs. 6A and 6B, it will be seen that the same general organization is provided as shown in Figs. 1A and 1B respectively. For example, a pair of line wires 4 extend between the central office and the typical wayside station. The central office includes the line carrier transmitter and line carrier receiver and associated control in the same manner as shown in Fig. 1A. Similarly, the typical wayside station in this modified form includes the radio transmitter and radio receiver together with a line carrier transmitter and line carrier receiver. Thus, the apparatus in this modified form of the invention corresponding with similar apparatus in Figs. 1A and 1B have been given the same reference characters.

The characteristic difference in this modified form of the invention lies in the fact that the direct current control provided over the line wires 4 in Figs. 1A and 1B has been replaced by a suitable distinctive tone control on the line carrier system. This is especially useful in certain cases where there may be a direct current service already on the line wires, and it is desired to organize the communication system of the present invention so as to be wholly of the carrier current type.

In this form of the invention a tone generator is associated with the line carrier transmitter at the central office which is effective, whenever the line carrier transmitter is rendered active by the picking up of the transmit relay TR, to superimpose upon the line carrier current a suitable distinctive tone, which may be of the super-audible type or may be within the audible range but above the particular voice frequencies employed for the usual voice message.

At each wayside station, as typically shown in Fig. 6B, the line carrier receiver has associated therewith a band-pass filter 65 which has an output connected through rectifier unit 66 to the line tone control relay 2LTC. Whenever the central office transmits a message, the carrier signal which it transmits is also modulated with the distinctive tone which is thus effective at the wayside stations to cause the energization of the associated line tone control relays. This relay 2LTC picks up at the typical station of Fig. 6B to close front contact 67 and 68 to render the associated radio transmitter effective. It is, of course, noted that the back contacts 67 and 68 are normally closed to render the radio receiver effective. When the voice message is received by the line carrier receiver, it is demodulated and transferred through connection 69 and through filter 70 to the radio transmitter for transmission as a radio message. This filter 70 is a low-pass filter for allowing the voice frequencies to be transferred from the line carrier receiver to the radio transmitter, but acts to filter or block any of the distinctive tone frequencies from the retransmitted message.

In this way, it is possible for the operator at the central office to obtain the same control over the wayside stations by the use of a distinctive tone as is provided by the use of a direct current control shown in Figs. 1A and 1B. Insofar as the typical operations of the system are concerned in connection with this modified form of the invention, it is to be understood that the wayside stations and the mobile train stations have the same characteristics and accomplish the same functions and features previously described.

Having described a system providing for communication between mobile stations as well as between the mobile stations and a central office, as a specific embodiment of the present invention, it is desired to be understood that the forms of the means shown have been selected to facilitate the disclosure of the invention rather than to limit the number of forms which it may assume; and, it is to be further understood that various modifications, adaptions and alterations may be made to the specific embodiment shown to meet the requirements of practice without in any manner departing from the spirit or scope of the present invention except as limited by the appended claims.

What I claim is:

1. In a radio communication system providing two-way communication between at least two mobile stations and also between the mobile stations and a plurality of fixed way stations on the same carrier frequency, radio transmitting and receiving means at each of said stations, each of said receiving means at said mobile stations being normally in a condition to receive radio carrier signals and also capable of reproducing a message imposed upon such a carrier signal, but each of said receiving means at said way stations being normally in condition to receive radio carrier signals although being ineffective to reproduce any message, a tone generator at each of said mobile stations associated with the radio transmitting means at that station, check pulse means at one of said mobile stations for automatically rendering its transmitting means active and its receiving means ineffective at spaced intervals to cause the transmission of spaced check pulse signals, means including a carrier responsive relay at said one mobile station for rendering the associated check pulse means ineffective at that station upon the reception of a radio carrier signal from any mobile or fixed station, indication means at the other mobile station maintained inactive only upon the continued reception of said spaced check pulse signals by its associated radio receiving means, manually operable means at each station effective when actuated to render the associated receiving means ineffective and the associated transmitting means active to send out a radio carrier signal, said manually operable means at each of said mobile stations being distinctively operable to at times render its associated tone generator effective to superimpose a tone frequency on the radio carrier signal being sent out by its associated radio transmitting means, and tone responsive means at the way station distinctively responsive only to the reception of a radio carrier signal having imposed thereon said tone frequency for allowing any message imposed upon such carrier signal to be effectively reproduced, whereby the check pulse signals transmitted by said one mobile station and the transmission of radio messages between said mobile stations in either direction are not effectively received at the way station.

2. In a communication system for providing communication between a plurality of movable vehicles and a central office, radio transmitting and receiving means on each vehicle having a limited range, fixed stations at intervals having radio transmitting and receiving means and spaced at intervals to provide a coverage corresponding with the range of the vehicle equipments, a line circuit connecting all of said fixed stations and a central office, transmitting and receiving means at the central office and at each fixed station operating on a line carrier frequency, the equipment at each fixed station being normally in condition to receive a radio signal or the line carrier frequency, relay means at each fixed station connected to its radio receiving means and energized by the reception of a radio signal from any vehicle within range for disconnecting the associated line carrier receiving means from the line circuit and connecting to said line circuit the line carrier transmitting means, means at each fixed station responsive to a line carrier frequency transmitted from any other fixed station or the central office for preventing energization of said relay means, and means at each fixed station manually controlled from the central office by energization of said line circuit distinctive from said line carrier frequency alone for rendering the associated radio transmitting means effective to send out a message transmitted by carrier over said line circuit from the central office.

3. In a train communication system for providing radio communication between trains and between a control office and trains at different locations in an equipped territory, radio transmitting and receiving means on each train having a limited range, manually operable means on each train effective only if no carrier is being received by its receiving means for rendering the normally active receiving means ineffective and its transmitting means effective to transmit signals from the train, way stations at intervals along the railroad having radio transmitting and receiving means with uni-directional antennas directed in the same direction along the railroad, said way stations being spaced to conform with the respective radio range of the trains, means including transmitting and receiving means at the central office and at each way station and operating on a distinctive carrier frequency for providing a two-way communication channel between said central office and all of said way stations, relay means at each way station governed over said communication channel for rendering the carrier frequency transmitting means at that way station ineffective to transmit to the central office radio messages received from a train when any other way station is being used for communication with the central office by some other train, and means at each way station manually controlled from the central office over said communication channel by an energization distinctive from said carrier frequency alone for causing all way stations to send out a radio message transmitted from the central office over said communication channel.

4. In a communication system for providing two-way communication between a central office and a plurality of movable vehicles, radio equipment on each vehicle including transmitting and receiving means operating on the same carrier frequency, a plurality of fixed stations each having radio transmitting and receiving means operating on the same carrier frequency and spaced at intervals to provide a coverage corresponding with the effective range of the radio equipment on the vehicles, means including a carrier frequency transmitter and receiver at each station and constituting a communication channel connecting all of said fixed stations and a central office for two-way communication between said central office and said fixed stations, relay control means at each fixed station responsive to the reception of a radio message from a vehicle within range of that station for rendering the carrier frequency transmitter at that station effective to act upon said communication channel in response to messages received by its radio receiving means, means at each fixed station governed over said communication channel and acting whenever a vehicle establishes communication with any fixed station for rendering ineffective said relay control means at all other fixed stations independently of the reception of radio mesages, and manually operable means in the central office effective only if no communication with the central office from any vehicle is then in effect for transmitting a distinctive control over said communication channel to all fixed stations to render their radio transmitters effective to send to all vehicles a message transmitted by carrier over said communication channel from the control office.

5. Vehicle equipment for radio communication systems comprising, a transmitter and a receiver operating on the same carrier frequency, means manually operable to render said receiver inactive and said transmitter active, a relay responsive to the reception of a carrier frequency by said receiver either modulated or unmodulated, a slow release relay energized when said carrier operated relay is energized, a stick circuit for said slow release relay including its own front contact, said stick circuit being closed when said manually operable means is actuated to render the transmitter active if said slow release relay is then picked up, and indicating means maintained inactive only so long as said slow release relay is energized.

6. A communication system of the character described comprising, a plurality of spaced fixed stations each having a radio transmitter and receiver, a central office, means constituting a communication channel between said central office and said stations and acting to transmit from all stations a carrier frequency modulated with the message from the central office, radio equipment on each of a plurality of vehicles including a transmitter and a receiver operating on the same carrier frequency as the station transmitters and receivers, pulsing means on certain of said vehicles normally acting to transmit at regularly spaced intervals pulses of unmodulated carrier frequency provided no carrier frequency modulated or unmodulated is then being received by that station, indicating means on other vehicles, and means for maintaining said indicating means on each of said other vehicles inactive only so long as carrier frequency pulses are being received at spaced intervals, said indicating means being rendered active by the reception of a sustained carrier frequency either from a fixed station or from another vehicle.

7. In a communication system of the character described for a central office and a plurality of vehicles, a plurality of fixed stations, a line circuit connecting all of said fixed stations with a central office, radio equipment including transmitting and receiving means at each fixed station and on each of a plurality of vehicles operating on the same carrier frequency, the radio equipment on each vehicle being normally in condition to receive and being manually operable only provided no carrier frequency is being received from some other source to transmit a carrier frequency with or without an audible control tone along with the message for communication with a fixed station within range or with some other vehicle within range, control means at each fixed station responsive to the reception of said control tone only from a vehicle for providing a line carrier on said line circuit to be modulated with the message from a vehicle, means at each fixed station responsive to said line carrier for rendering its control means unresponsive to the reception of a control tone by its associated receiving means, and means manually operable in a control office provided no line carrier is then being received for transmitting a distinctive control over said line circuit, and means at each fixed station responsive to said distinctive control on said line circuit for rendering active the radio transmitters at all of the fixed stations to permit a message from the central office to be sent to all vehicles.

8. In a communication system providing radio communication between a plurality of movable vehicles and a plurality of fixed stations connected with a central office, radio equipment on each vehicle including transmitting and receiving means of limited range operating on the same carrier frequency, circuit means manually controllable for rendering said radio transmitting means at times effective to transmit a message with or without a distinctive signal, a first relay means controlled by said radio receiving means when a carrier frequency is being received to prevent said manually controllable circuit means from rendering said radio transmitting means effective, a plurality of fixed stations located at intervals corresponding with the range of said vehicle equipments, each of said fixed stations having radio transmitting and receiving means operating on said carrier frequency, means providing a communication channel connecting all of said fixed stations and said central office, control means at each fixed station including a control relay and an energizing circuit for such relay controllable by the associated radio receiver when said distinctive signal is received for causing the received message to be repeated onto said communication channel for transmission to the central office, and a second relay means at each fixed station governed over said communication channel and operated whenever said communication channel is in use for transmission to the central office from any fixed station and including a contact in said energizing circuit opened when said second relay means is operated for preventing operation of said control means by reception of said distinctive signal, said second relay means being effective on said control means at all fixed stations other than the station then receiving from a movable vehicle without rendering the associated radio transmitter active, whereby any vehicle beyond the range of a given vehicle communicating with the central office is unable to establish an interfering communication with the central office but may communicate at any time with other vehicles within its range.

NEIL D. PRESTON.

REFERENCES CITED

The following references are of record in the file of this patent:

UNITED STATES PATENTS

| Number | Name | Date |
|---|---|---|
| 1,678,672 | Espenschied et al. | July 31, 1928 |
| 1,740,621 | Nyguist | Dec. 24, 1929 |
| 1,891,299 | Anderson | Dec. 20, 1932 |
| 2,061,699 | Fox | Nov. 24, 1936 |
| 2,064,958 | Taylor et al. | Dec. 22, 1936 |
| 2,248,746 | Davis | July 8, 1941 |
| 2,265,056 | Bowers | Dec. 2, 1941 |
| 2,393,291 | Clark | Jan. 22, 1946 |
| 2,407,846 | O'Brien | Sept. 17, 1946 |
| 2,469,555 | Hitchcock | May 10, 1949 |
| 2,490,061 | Jensen et al. | Dec. 6, 1949 |